April 23, 1968 — J. YAKOVOU — 3,379,812
METHOD OF MAKING FASHIONED FIELDSTONE
Filed Nov. 13, 1964

Original Stone Form

Filling Original Form

Stripping Female Duplicate Form

Filling Female Duplicate Form

Stripping Duplicate

Cutting Male Duplicate Form

Finished Male Duplicate Form

John Yakovou
INVENTOR.

April 23, 1968  J. YAKOVOU  3,379,812
METHOD OF MAKING FASHIONED FIELDSTONE
Filed Nov. 13, 1964  2 Sheets-Sheet 2
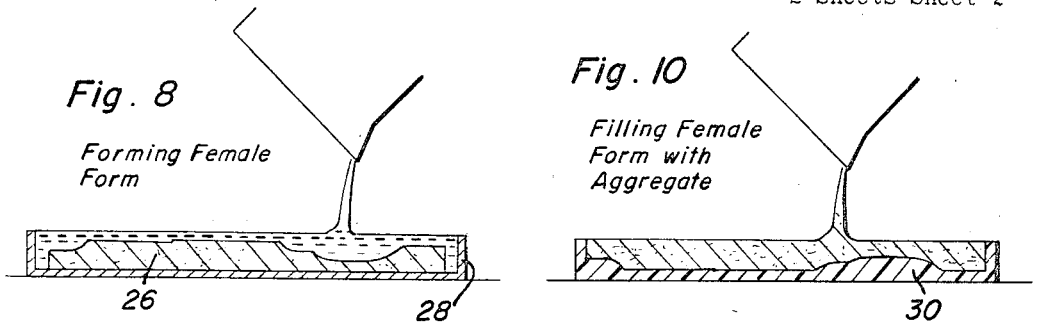
Fig. 8 Forming Female Form
Fig. 10 Filling Female Form with Aggregate
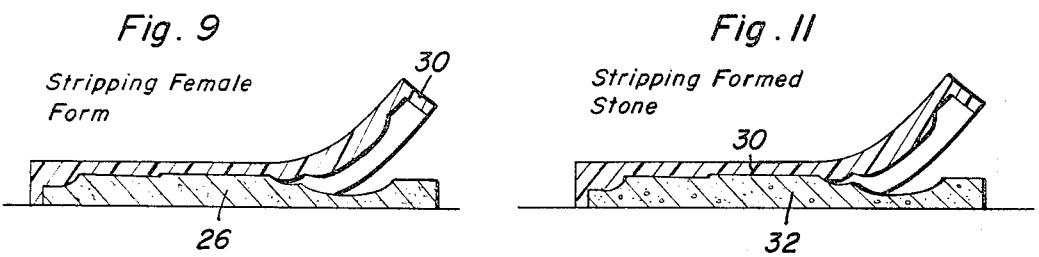
Fig. 9 Stripping Female Form
Fig. 11 Stripping Formed Stone
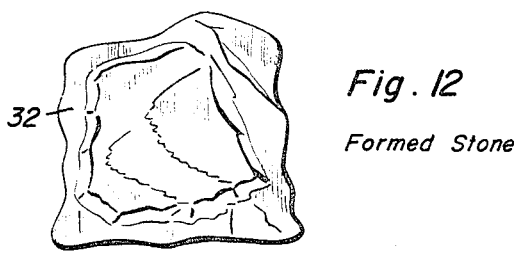
Fig. 12 Formed Stone
Fig. 13
John Yakovou
INVENTOR.
BY *Clarence A. O'Brien*
*and Harvey B. Jackson*
Attorneys 3,379,812
METHOD OF MAKING FASHIONED FIELDSTONE
John Yakovou, 3 Pert Place, East Northport, N.Y. 11768
Filed Nov. 13, 1964, Ser. No. 410,873
6 Claims. (Cl. 264—227)

ABSTRACT OF THE DISCLOSURE

An artificial fieldstone is produced by forming a female mold from an original fieldstone, forming a duplicate of the original stone utilizing the female mold, shaping the edge of the duplicates to a predetermined configuration so that a plurality of such duplicates of different outline, respectively, may be assembled side by side to form a pattern of predetermined configuration, forming a finished female mold utilizing the shaped duplicate, and forming a finished artificial fieldstone utilizing the finished female mold.

---

The instant invention is concerned with building material, and is more particularly directed to a novel method of making fashioned fieldstone.

One of the primary objects of the instant invention is to provide a method for forming irregularly shaped fashioned fieldstone which closely approximates real fieldstone in both color and texture.

In conjunction with the above object, it is also an object of the instant invention to provide fashioned fieldstone which is formed in a manner so as to have mating or interlockable edges with adjacent differently shaped units so as to form a grouping of, for example, seven differently formed units which may be repeated throughout a particular job. Incidentally, it will also of course be appreciated that the instant invention contemplates the use of individual units.

Likewise, it is an object of the instant invention to provide for a fashioned fieldstone unit wherein the face of the unit is an exact duplicate of an actual stone, while the edges thereof are specifically fashioned in a predetermined manner so as to mate with an adjoining unit.

Furthermore, it is an object of the instant invention to provide for a grouping of a predetermined number of fashioned stones wherein each stone is formed with an irregular edge which mates with the adjoining edges of two or more stones of the grouping.

Basically, the above objects are achieved through a method wherein initially a female mold or form is made from an actual fieldstone with this form being utilized in the formation of a male duplicate of the original stone formed of a solid shape retaining material which can be easily cut by a conventional bandsaw, or other cutting means. The formed male duplicate is then irregularly cut about the edges thereof so as to produce a male form or duplicate with irregularly cut edges from which another female form can be produced. This last-mentioned female form is then utilized in producing the final fashioned fieldstone for use in conjunction with other differently shaped and textured fashioned fieldstone having irregular edges which substantially mate with the edges of the first described fashioned fieldstone.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 8 illustrates the forming of the final or finished female form on the male form;

FIGURE 9 illustrates the stripping of the final female form;

FIGURE 10 illustrates the forming of the finished fashioned fieldstone;

FIGURE 11 illustrates the stripping of the final fieldstone unit;

FIGURE 12 illustrates the formed stone unit ready to be applied to, for example; a building; and FIGURE 13 illustrates the unit of FIGURE 12 orientated in a grouping with six additional units formed in a similar manner, all of the units provided with mating or interlocking edges spaced slightly from each other so as to allow for a mortar joint.

Figure 1:
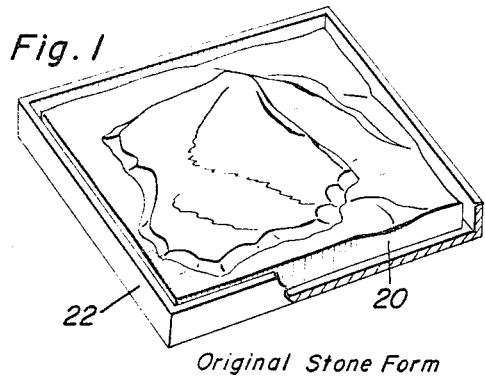
FIGURE 1 is a perspective illustration of the actual original stone positioned within a form box.
Figure 2:
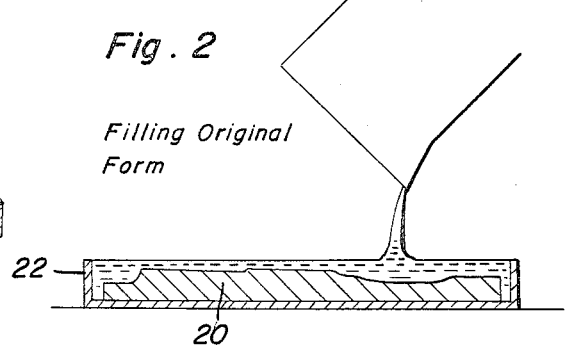
FIGURE 2 illustrates the forming of an initial female mold.
Figure 3:
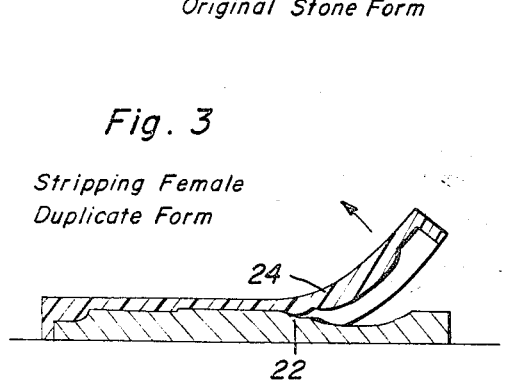
FIGURE 3 illustrates a stripping of the initial female mold from the actual stone.
Figure 4:
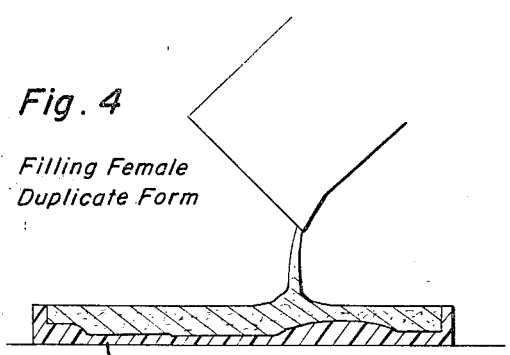
FIGURE 4 illustrates the filling of the first female duplicate or form.
Figure 5:
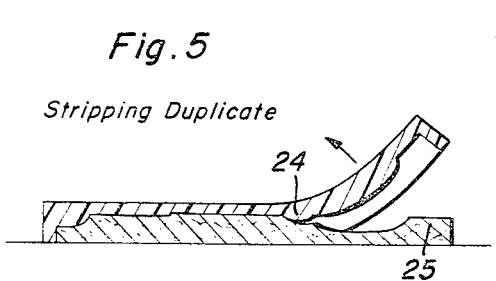
FIGURE 5 illustrates a stripping of the female form from the rough male form.
Figure 6:
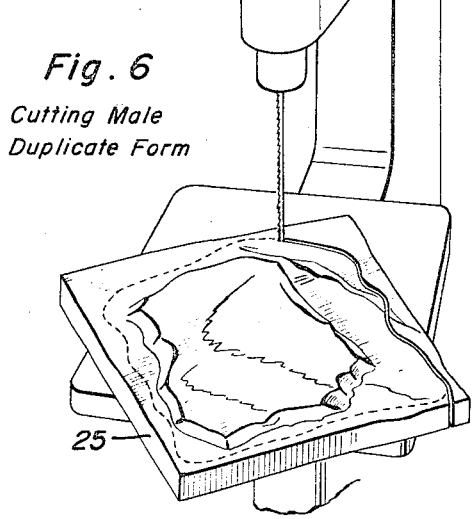
FIGURE 6 is a trimming of the male form to a specific irregular edge configuration.
Figure 7:
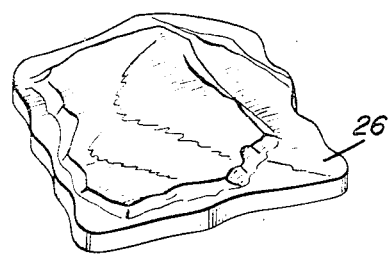
FIGURE 7 illustrates the finished male form.

Referring now more specifically to the drawings, viewing FIGURES 1 through 13 sequentially, it will be noted that the initial step of the method involved herein consists of positioning a selected generally rectangular actual fieldstone 20 within a form box 22. Next, a female impression or duplicate is made of the stone 20 by pouring any suitable plastic, rubber or glue, in its liquified state, over the stone 20 within the original form box 22, thereby obtaining an exact duplicate of the contour and texture of the face of the stone. After the liquified material has solidified, this being accomplished, for example, by simply allowing the material to cool or set for a predetermined length of time, a female duplicate form 24 of the original stone 20 is produced, this form 24 being stripped from the stone 20 and subsequently utilized as a mold to receive a liquified material which, when solidified, can be readily easily cut by conventional cutter means, such as for example the bandsaw illustrated in FIGURE 6. One example of such a material would be a composition of asbestos, plaster and epoxy. After this composition has solidified, the original female form 24 is stripped therefrom leaving the rough male form 25 which is, at this time, trimmed about the edges thereof so as to produce a specific irregular configuration, thereby producing the finished male duplicate form 26. As will be appreciated, this finished male duplicate form, while having a specifically formed irregular edge, also retains the upper face which is an exact duplicate of the contour and texture of the original stone 20. The male form 26 is then set into a generally rectangular form box 28 which in turn receives, to a depth sufficient so as to cover the finished male form 26, liquified rubber or plastic. Upon solidifying, this rubber or plastic produces the finished female form or mold 30 which, after stripping from the finished male form 26, is utilized in the formation of the finished stone units 32 which are to actually be utilized in construction. The finished stone units 32 are produced by the casting of various colored stone aggregate, and of course a suitable cementing or bonding agent, in the finished female mold 30 and allowing a setting thereof prior to stripping of the finished female form for use in forming subsequent duplicate units. It will of course be appreciated that the particular stone aggregate used in forming the finished unit 32 will be such as to produce a finished unit 32 of the particular color and surface texture sought.

While the finished formed or fashioned fieldstone 32, formed in the above manner, can be used as an individual stone randomly arranged with similar or different stones, it is contemplated that this stone 32 be used in conjunction with several, specifically six, additional units which, while formed in the above manner, are, or can be, originated from different original stones so as to have different facial textures and contours from the specific unit 32. However, all of the units in the grouping are to have the random irregularly cut edges thereof formed so as to generally mate with the edges of the adjoining units when grouped into a rectangular pattern, which incidentally is to be approximately 41 inches by 21 inches, the units of course being spaced slightly from each other, as will be apparent from FIGURE 13, so as to allow for mortar joints therebetween, these joints actually being filled with a mortaring compound if so desired. Further, as will be recognized from FIGURE 13, it is contemplated that the grouping of seven units is to be used in conjunction with similar groupings throughout the length and height of the particular wall to which the facing is being applied, as well as with smaller rectangular groupings, for example the five left-hand units in FIGURE 13 forming a rectangular pattern approximately 32 inches by 21 inches.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invetnion as claimed.

What is claimed as new is as follows:

1. The method of making fashioned artificial fieldstone comprising the steps of forming a female mold from the original fieldstone; forming a duplicate of the original stone utilizing said female mold; shaping the duplicate; forming a finished female mold utilizing the shaped duplicate; and forming a finished artificial fieldstone utilizing said finished female mold.

2. The method defined in claim 1, wherein said shaping of said duplicate comprises shaping of the edge thereof.

3. In a method of making an arrangement comprising a series of fashioned fieldstone which may be assembled to form a pattern of predetermined configuration, the steps of forming female molds from each of a plurality of original fieldstones, forming duplicates of said original fieldstone utilizing said female molds; shaping the edges of said duplicates so that said duplicates can be assembled to form said predetermined pattern; forming finished female molds utilizing said shaped duplicates; and forming finished artificial fieldstones utilizing the finished female molds, respectively, so as to obtain a plurality of artificial fieldstones capable of being assembled to form said predetermined pattern.

4. A method as dened in claim 3, wherein said fieldstones may be assembled side by side to form said predetermined pattern and at least two fieldstones of said plurality of original fieldstones are of different configuration.

5. A method as defined in claim 4, wherein said plurality of artificial fieldstones is assembled side by side so as to form said predetermined pattern.

6. A method as defined in claim 5, wherein said artificial fieldstones are assembled slightly spaced from each other so as to form therebetween mortar joints, and comprising the step of filling said mortar joints with mortar.

References Cited
UNITED STATES PATENTS

| | | | |
|---|---|---|---|
| 2,652,595 | 9/1953 | Kish | 264—227 |
| 3,058,164 | 10/1962 | Rowe | 264—220 |
| 3,189,670 | 6/1965 | Robison | 264—227 |

JAMES A. SEIDLECK, *Primary Examiner.*

FRANK L. ABBOTT, DONALD J. ARNOLD,
*Examiners.*

R. S. VERMUT, J. R. THURLOW,
*Assistant Examiners.*